(12) United States Patent
Gibbons

(10) Patent No.: US 8,462,973 B2
(45) Date of Patent: Jun. 11, 2013

(54) EAR FITTING

(75) Inventor: Wayne M. Gibbons, Bear, DE (US)

(73) Assignee: W.L. Gore & Associates, Inc., Newark, DE (US)

( * ) Notice: Subject to any disclaimer, the term of this patent is extended or adjusted under 35 U.S.C. 154(b) by 155 days.

(21) Appl. No.: 12/781,416

(22) Filed: May 17, 2010

(65) Prior Publication Data

US 2011/0280425 A1 Nov. 17, 2011

(51) Int. Cl.
*H04R 25/00* (2006.01)
*H04R 25/02* (2006.01)

(52) U.S. Cl.
USPC ........... 381/328; 181/130; 381/323; 381/325; 381/330

(58) Field of Classification Search
USPC .................... 381/328, 330; 181/130
See application file for complete search history.

(56) References Cited

U.S. PATENT DOCUMENTS

| | | | |
|---|---|---|---|
| 3,953,566 A | 4/1976 | Gore | |
| 4,880,076 A * | 11/1989 | Ahlberg et al. | 181/130 |
| 4,987,597 A * | 1/1991 | Haertl | 381/325 |
| 5,002,151 A * | 3/1991 | Oliveira et al. | 181/130 |
| 5,116,650 A | 5/1992 | Bowser | |
| 5,286,279 A | 2/1994 | Wu | |
| 5,342,434 A | 8/1994 | Wu | |
| 5,462,586 A | 10/1995 | Sugiyama et al. | |
| 5,682,020 A * | 10/1997 | Oliveira | 181/130 |
| 5,694,475 A * | 12/1997 | Boyden | 381/327 |
| 5,737,436 A * | 4/1998 | Boyden | 381/385 |
| 5,814,405 A | 9/1998 | Branca et al. | |
| 5,824,967 A * | 10/1998 | Zwislocki | 181/130 |
| 5,920,636 A * | 7/1999 | Oliveira et al. | 381/328 |
| 6,310,961 B1 * | 10/2001 | Oliveira et al. | 381/328 |
| 7,298,857 B2 * | 11/2007 | Shennib et al. | 381/324 |
| 7,313,245 B1 * | 12/2007 | Shennib | 381/325 |
| 7,600,604 B2 * | 10/2009 | Babcock et al. | 181/130 |
| 2005/0259840 A1 * | 11/2005 | Gable et al. | 381/323 |
| 2006/0291682 A1 * | 12/2006 | Urso et al. | 381/328 |
| 2007/0183606 A1 * | 8/2007 | Doty | 381/72 |
| 2008/0031482 A1 * | 2/2008 | Shennib et al. | 381/328 |
| 2008/0123866 A1 * | 5/2008 | Rule et al. | 381/71.6 |
| 2008/0123889 A1 * | 5/2008 | Caldarola | 381/328 |
| 2009/0316940 A1 * | 12/2009 | Pander et al. | 381/323 |
| 2010/0030256 A1 * | 2/2010 | Dubrul et al. | 606/200 |
| 2010/0166241 A1 * | 7/2010 | Sabio | 381/328 |

FOREIGN PATENT DOCUMENTS

| | | |
|---|---|---|
| WO | WO 97/11573 | 3/1997 |
| WO | WO 99/51058 | 10/1999 |

OTHER PUBLICATIONS

Table 2—Permeability Coefficient of Common Polymers, Welding Journal, p. 37, No. date listed, but referenced on Nov. 26, 2012 to show known material permeabilities, http://www.faybutler.com/pdf_files/HowHoseMaterialsAffectGas3.pdf.*
International Search Report for PCT/US2011/036510.

* cited by examiner

*Primary Examiner* — David Warren
*Assistant Examiner* — Christina Russell
(74) *Attorney, Agent, or Firm* — Richard W. Ellis

(57) ABSTRACT

An improved open ear hearing aid fitting for insertion into an ear canal is provided. The fitting offers enhanced acoustic performance while maintaining user comfort. The fitting comprises a polymeric body having at least one acoustic source and at least one aperture extending there through and a peripheral portion shaped to conform to surface of the ear canal. A porous material covers at least one aperture of the body.

11 Claims, 6 Drawing Sheets

EAR FITTING

BACKGROUND OF THE INVENTION

There are a broad array of electrical and electronic devices which incorporate components that deliver acoustic energy into the ear canal of a listener. Hearing aids and so called "ear bud" headphones for cell phones, portable audio players, etc. are but representative examples of such devices. Several configurations of ear fittings exist for delivering acoustic energy directly to the ear canal, including configurations known as open ear fittings, open fit, closed ear fittings, foam fittings etc. Examples of hearing aid devices some of which utilize such ear fittings include: Behind the Ear (BTE), In the Ear (ITE), In the Canal (ITC), Completely in the Canal (CIC), Over the Ear (OTE) or Open-Fit devices. Each of the fitting devices is known to involve compromises of acoustic performance, user comfort and other criteria.

Open-Fit hearing aids or open-ear fittings may comprise a shaped fitting for placement within the ear canal. The fitting itself may include a polymeric ear tip that is sufficiently elastomeric to conform to an ear canal. Open ear fittings are so named because they provide some opening between the ear canal and the environment.

Such openings may help to reduce an undesirable acoustic characteristic known as the occlusion effect. The occlusion effect causes the listener to perceive low frequency or base sounds to be louder and possibly more distorted. The sources of the sounds that are typically associated with the occlusion effect include the user's own voice, chewing, other jaw movement etc. Open ear fittings reduce this effect because the open areas within the fitting allow some of the acoustic energy delivered to the ear canal to escape. The increased air exchange between the ear canal and the environment provided by such open ear fittings may also improve user comfort. However, these open areas or pathways, while providing some advantage may promote other undesirable acoustic effects.

The open areas provided in open ear fittings may, however, cause parasitic or sound distorting resonances. Distortions at certain frequency ranges of around 1 to 3.5 kHz are particularly important and could result in noticeably degraded acoustic performance. Moreover, some acoustic energy may be lost as it escapes through the open area. Typically, isolation from external environment is poor allowing external sound to leak around the fitting directly into the ear canal.

A need clearly exists for an open ear fitting which has improved acoustic performance while maintaining user comfort.

DETAILED DESCRIPTION OF THE INVENTION

The present invention relates to ear fittings used to deliver acoustic energy directly to an ear canal. More specifically, a region of porous material is provided in an ear fitting such that the device offers improved acoustic performance when compared to conventional open or closed fitting ear devices while maintaining the user comfort of such open ear designs.

Figure 1A:
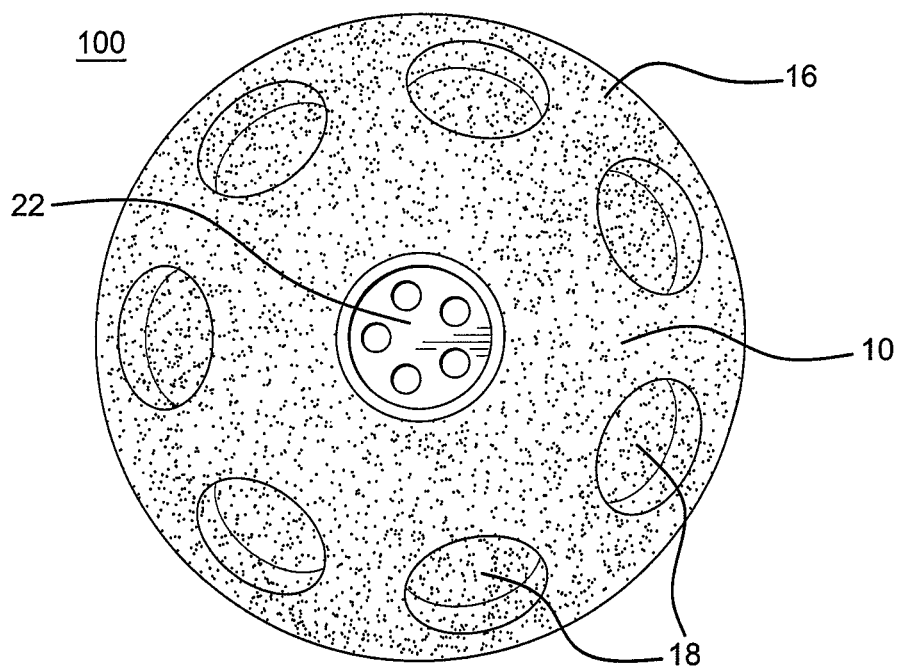
FIG. 1 represents a perspective view of one embodiment of the improved ear fitting.
Figure 1B:
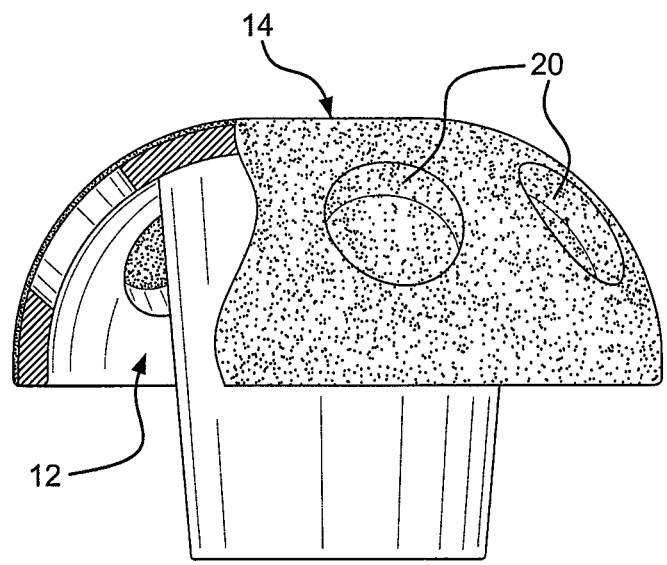
Figure 2:
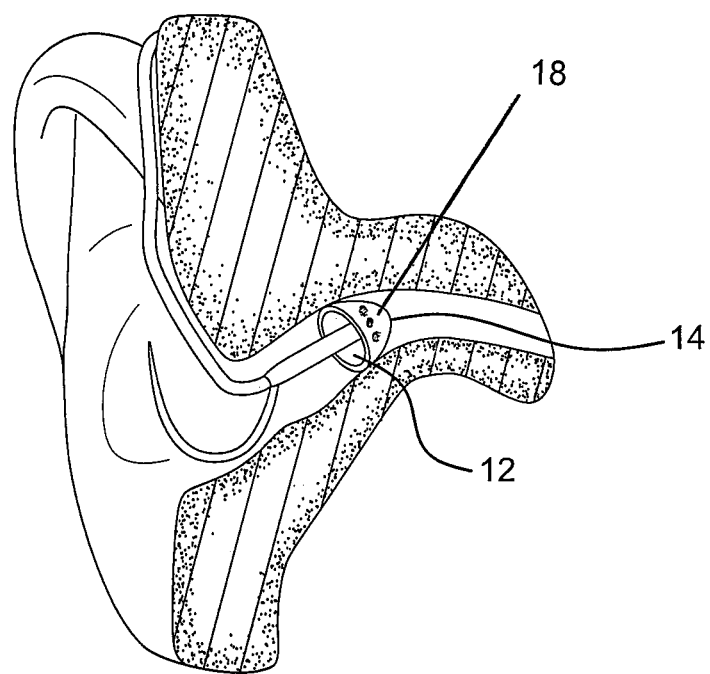
FIG. 2 depicts the improved ear fitting inserted into the ear canal.
Figure 3:
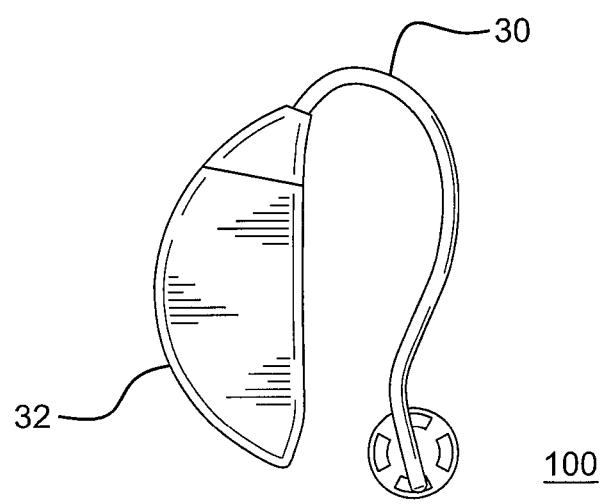
FIG. 3 shows the improved ear fitting attached to the hearing aid.

As shown in FIG. 1a, 1b and FIG. 2, the inventive open ear fitting (100) comprises a body (10) having an interior face (14) oriented towards the inside of the ear canal and an exterior face (12) oriented towards the exterior of the ear. The body may be polymeric and may further comprise a peripheral conformal portion (16), shaped to conform to the ear canal surface. The body may be entirely comprised of elastomer, or may include elastomeric portions, which help the body to conform to the canal. Apertures (18) extend through the polymeric body from the interior face to the exterior face. A porous material (20) covers the apertures in the polymeric body. An acoustic source (22) is positioned upon or within the polymeric body as shown in FIG. 1. The acoustic source may be a electro acoustic transducer, such as a piezoelectric speaker or other transducer for generating acoustic energy. Alternatively, the body may be connected to a flexible sound tube (30) and attached to the hearing aid (32) as shown in FIG. 3. In this embodiment, sound is delivered via the sound tube directly into the ear canal.

The body may be constructed of resilient soft elastomeric materials such as Silicone rubber or any other soft polymer. The body may also be constructed of compressible foams such as polyurethane or polyvinylchloride. In such a construct, the body may be provided with a rigid plastic adapter to hold the foam in place. The body may be formed by methods known in the art and may take any shape including dome, fluted, conical, star, bulbous, or other shape.

Apertures that extend from the interior to the exterior face of the body may be of any shape, size or number. The shape and number of apertures may be chosen to provide adequate air exchange between the ear canal and the environment and to reduce the occlusion effect. Apertures may be formed in the polymeric body by known mechanical means such as injection molding, or by punching.

The porous material covering the apertures may be selected from materials such as wovens, non-wovens, fabrics, knits or membranes. These materials are made of polymers including, but not limited to polyurethane, polysulfones, polyvinylidene fluorine (PVDF), perfluoroalkoxy polymer (PFA), polyolefins, fluorinated ethylene propylene (FEP), acrylic copolymers and polytetrafluoroethylene (PTFE). Preferably, the porous material is expanded PTFE (ePTFE) made according to the teachings of U.S. Pat. Nos. 5,814,405 or 3,953,566. The polymeric porous material may be advantageously rendered oleophobic using for example, the teachings described in U.S. Pat. Nos. 5,116,650, 5,462,586, 5,286,279, and 5,342,434.

The porous material may be attached to the polymeric body by any known attachment means including adhesives, thermal bonding, or insert molding.

Figure 4A:
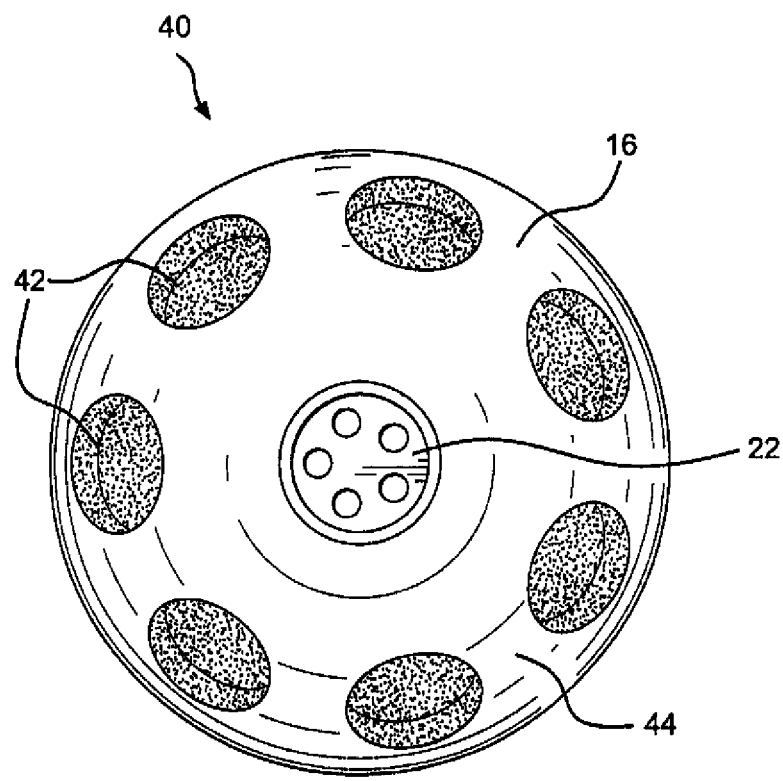
FIGS. 4A and 4B represents a perspective view of another embodiment of the improved ear fitting.
Figure 4B:
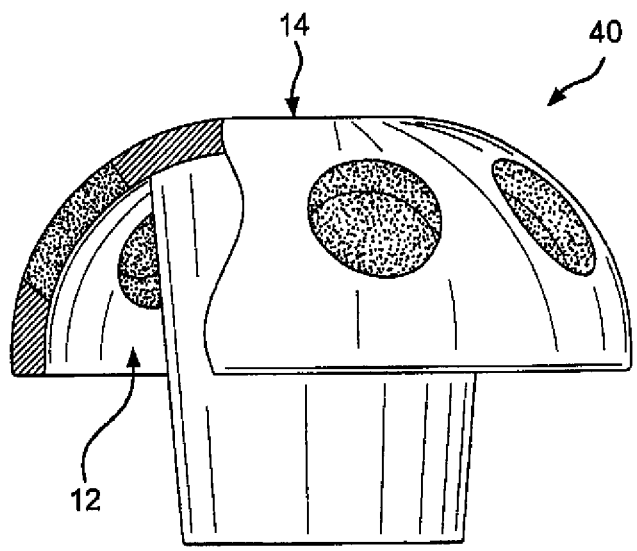

FIGS. 4a and 4b show another embodiment of the invention. In this embodiment (40), the body is constructed by partially filling a porous material (42) with an impermeable polymeric material (44). Where filled, the porous material provides a scaffold for the elastomer. The body is shaped as described above. Certain areas of the porous material are left unfilled. These unfilled areas provide apertures for air exchange and acoustic transmission through the porous media. As described above, the shape and number of unfilled areas is selected to provide adequate exchange of air and acoustic energy for user comfort and acoustic performance. Examples of elastomers disposed within the porous material may include fluoroelastomers, perfluoroelastomers, fluorosilicone, silicone, polybutadiene, styrene-butadiene, EPDM (ethylene propylene diene rubber), polysioprene, butyl rubber, ethylene vinyl acetate, nitrile rubbers, etc.

EXAMPLE 1

Figure 5A:
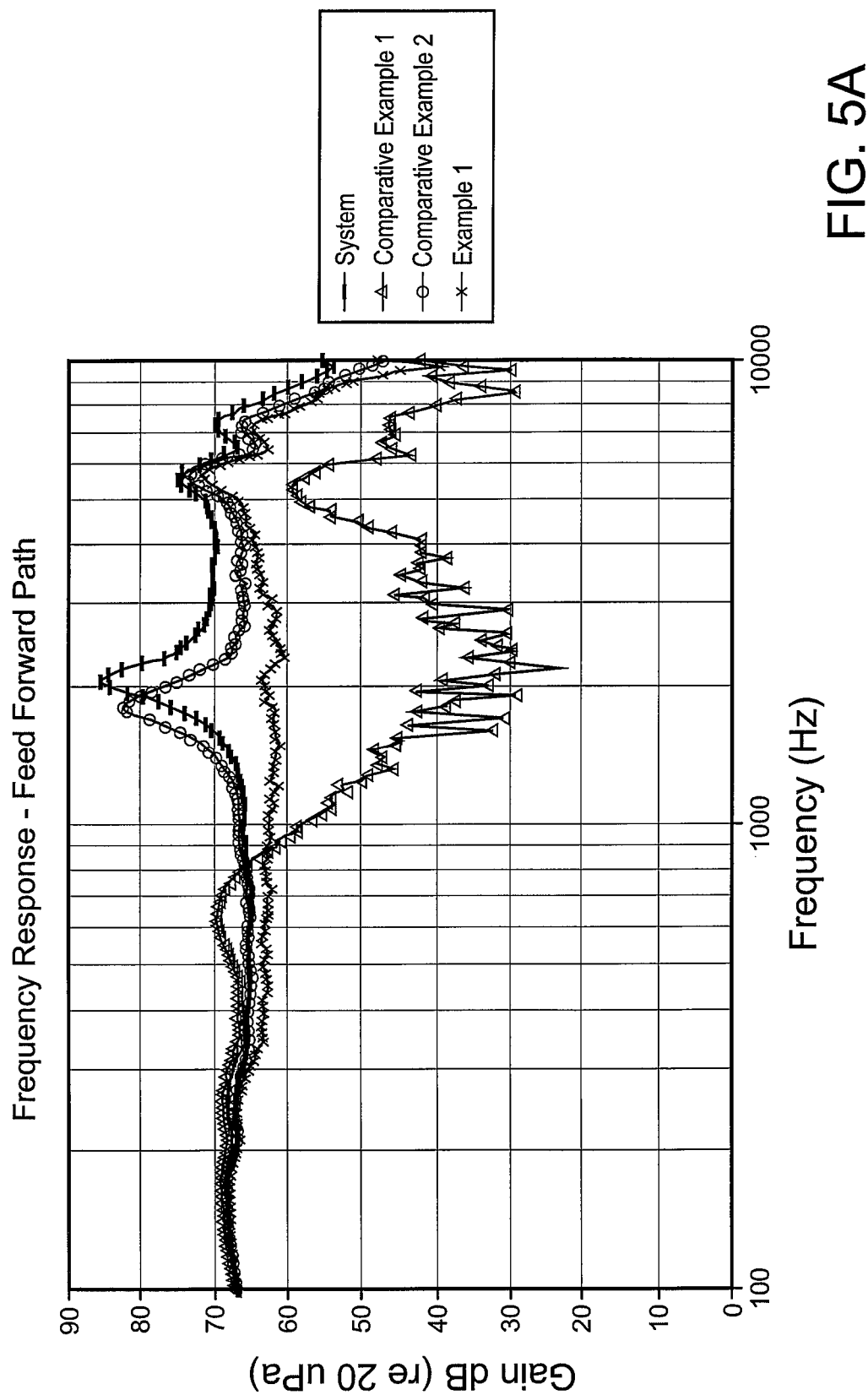
FIGS. 5a and 5b show a comparison of the acoustic performance of the improved ear fitting of Example 1 and the ear fitting as well as the closed ear fitting of the Comparative Examples.
Figure 5B:
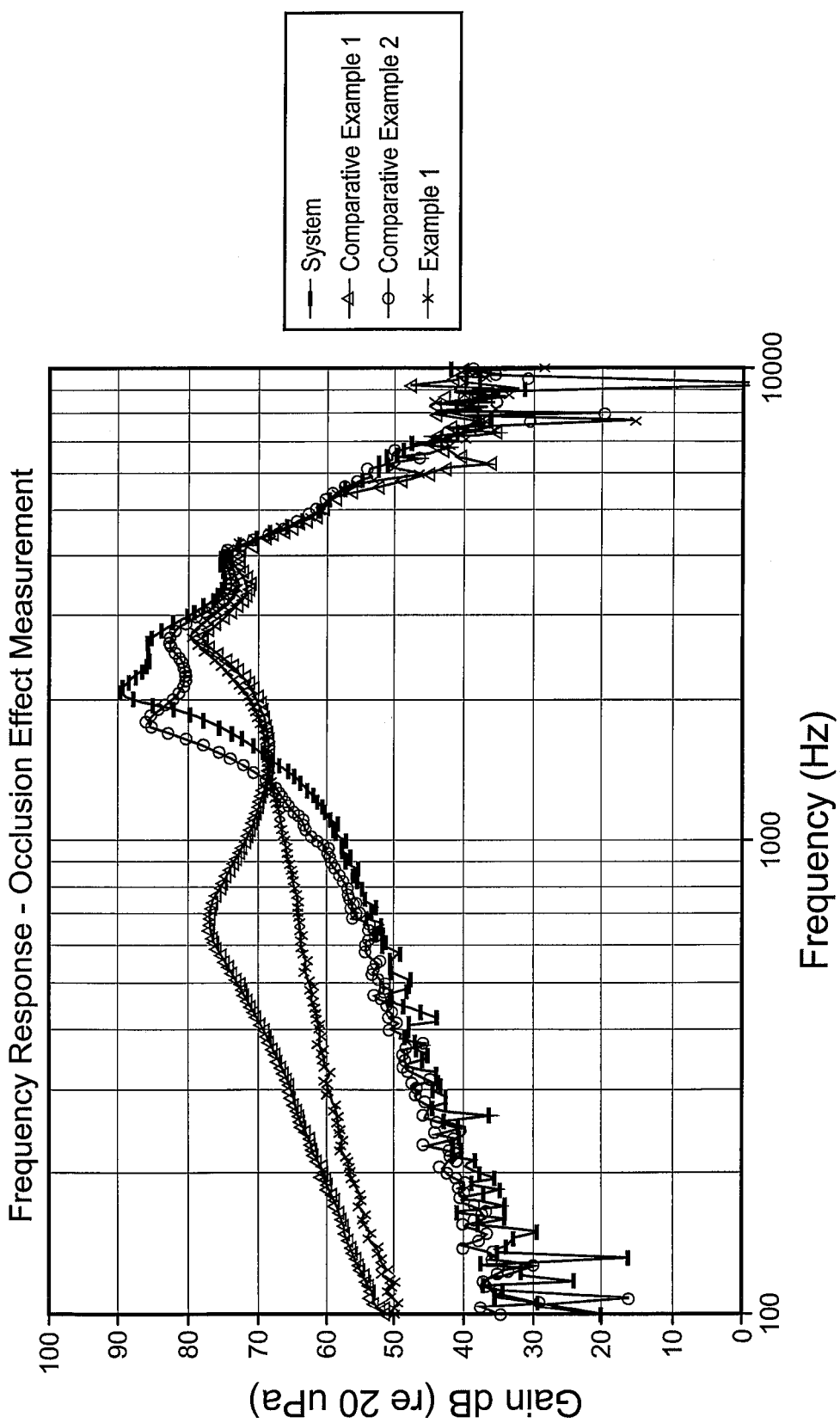

An open ear fitting was constructed using a dome shaped Silicone tip (Part No. 10417709, The Hearing Company, Inc.). Eight equal sized apertures of diameter 1.75 mm were punched into the dome portion of the tip using a beveled circular punch. The center to center distance between the apertures was 2.3 mm arranged in a circular pattern around the dome. All the apertures were covered with an ePTFE membrane having an air permeability of 100 Frazier and mass of 2 g/m$^2$). The membrane was attached to the tip by applying DOW CORNING® 732 sealant on the peripheral portion of the Silicone tip and by draping the membrane over the tip. Excess membrane was trimmed around the edges of the peripheral portion of the tip. The acoustic performance of the porous membrane covered tip was measured. The results are shown in FIGS. 5a and 5b as graphs with Gain (dB from 20 uPa reference) on the y-axis and Frequency (Hz) on the x-axis. The open ear fitting of this example had an MVTR of 38 mg/day. The air flow through the fitting was measured to be 50 liter/hr at a back pressure of 0.025 psi.

Comparative Examples

Two fittings were compared to the inventive open ear fitting.

The first comparative example was a closed ear fitting comprising the dome shaped silicone tip (Part No. 10417709, The Hearing Company, Inc.) as originally obtained from the manufacturer. The MVTR of this closed ear fitting was measured to be 5 mg/day. The air flow through the closed ear fitting was zero.

A second Comparative example was constructed from the above dome-shaped silicone tip. In this example, however, an open ear fitting was constructed by punching out eight apertures of size 1.75 mm into the dome-shaped Silicone tip (as described in preparation for the membrane covered example). The open ear fitting of this example had an MVTR of 38 mg/day. The air flow through the fitting as measured to be 113 liter/hr at a back pressure of 0.025 psi.

The acoustic performance of both the comparative examples was measured. The results are shown in FIGS. 5a and 5b as graphs with Gain (dB from 20 uPa reference) on the y-axis and Frequency (Hz) on the x-axis.

As shown in FIG. 5a, at a frequency of about 2 kHz, the fitting in Example 1 covered with the porous membrane does not show a resonant peak. In comparison, at the same frequency, the open ear fitting of the second comparative example without the porous cover shows a resonant peak, thereby illustrating the improved acoustic performance of the porous material covered open ear fitting of the invention. At the lower frequency range (less than 1000 Hz), the closed ear fitting of the first comparative example exhibits a peak and also shows reduced gain which is predictive of increased isolation at the higher frequencies.

As shown in FIG. 5b, at the lower frequency range (less than 1 kHz), the fitting in Example 1 shows a flat response. In comparison, at the same frequency range, the closed ear fitting of the first comparative example shows a resonant peak at about 700 to 800 Hz, which contributes to the occlusion effect.

Test Methods

Air Permeability

The Frazier permeability reading is the rate of flow of air in cubic feet per square foot of sample area per minute at a differential pressure drop across the test sample of 12.7 mm water column. Air permeability was measured by clamping a test sample into a circular gasketed flanged fixture which provided a circular opening of 17.2 cm diameter (232 cm$^2$ area). The upstream side of the sample fixture was connected to a flow meter in line with a source of dry compressed air. The downstream side of the sample fixture was open to the atmosphere. The flow rate through the sample was measured and recorded as the Frazier number Moisture Vapor Transmission Rate This test is a measure of the rate of water vapor transmission through an ear fitting. A glass vial assembly fitted with a rubber tipped cap [Part Number 15040G 60, Manufacturer: Kimble Chase] was filled, with 50 ml of de-ionized water. The top of the cap was cut off to create a cylindrical rubber member that created a snug fit with the ear fitting examples. The ear fitting was inserted into the hole of the rubber tip. The acoustic port of the ear fittings was plugged using a stainless steel pin 0.125 inch in diameter and 0.25 inches in length to restrict moisture diffusion and permeation to only the dome area. The apparatus comprising the above ear fitting inserted into the water filled glass vial was placed in a temperature and humidity controlled environment regulated at 22° C. and relative humidity of 50%. From this point onwards, the weight of the apparatus was taken every 24 hours for 1 week. Model AG204 balance manufactured by Metler Toledo Corporation was used. The loss in weight was attributed to the loss in moisture due to diffusion through the ear fitting. The weight loss was reported in units of mg/day over the course of 1 week. This value was referred to as the Moisture Vapor Transmission Rate (MVTR). An average of the last 4 measurements was used to account for non-steady state effects during the first measurements.

Air Flow Through Ear Fitting

A 9 mm (ID) tube of length of about 10 cm was connected to the air flow test equipment [Model D520 Flow Tester, ATEQ Corp]. The ear fitting was press fit into the tube. The acoustic port of the ear fitting was plugged with a pin to measure the effective airflow through the dome portion of the fitting. A back pressure of 0.025 PSI was applied and the air flow recorded in liter/hour.

Acoustic Performance

Feed Forward Signal Capability

Figure 6A:
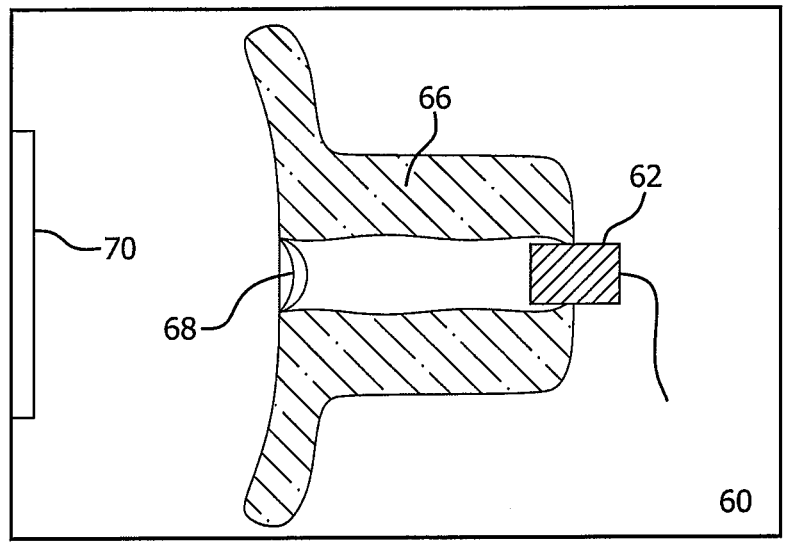
FIGS. 6a and 6b show schematics of the test equipment used for measuring acoustic performance.

The following test method characterizes the Feed Forward Signal capability of the ear fitting by measuring the external signal (unamplified by a hearing aid) leakage through an ear fitting. The test equipment comprised of an anechoic measurement chamber (60) (Brüel & Kjær, Part No. 4232), conditioner and amplifier (Brüel & Kjær, Part No. 2716), microphones (62) (pre-polarized B&K field mic Part No. 4947), PC with sound card (Lynx Studio Technology, Inc. Part No: Lynx TWO-A) and software (SoundCheck v8.11, Listen, Inc.). A stereo-lithography model (66) of the human ear having an ear canal with a length of about 36 mm, and inner diameter of about 9 mm was used as an ear coupler. The schematic of the test set up is shown in FIG. 6a.

The ear fittings (68) with the center acoustic ports plugged with a pin were inserted into the ear coupler. Sine wave sweep from 10000 Hz to 100 Hz using the "STWEEP™ function of the software was the sound stimulus used (stimulus amplitude of 50 mV, and amplifier gain of 30 dB). The speaker (70) in the anechoic chamber was the source used to provide this sound stimulus. The SoundCheck software was used to generate the performance graph showing system gain versus frequency.

Conduction Effect

Figure 6B:
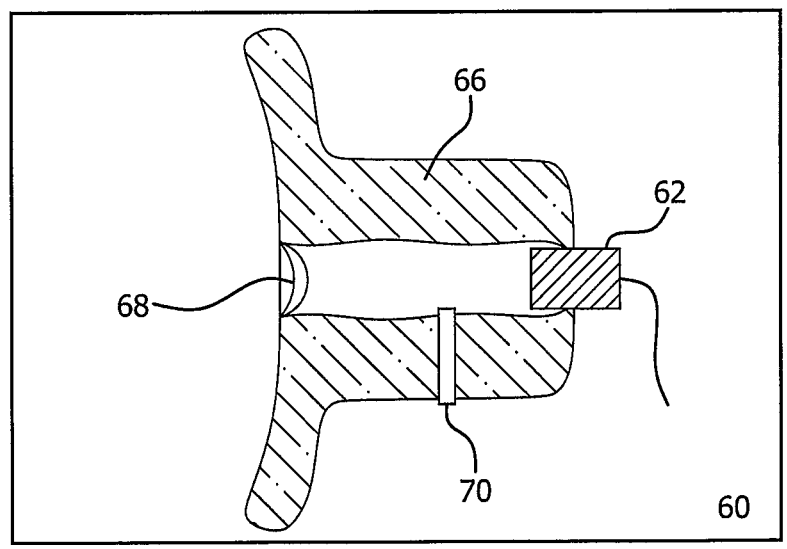

Conduction of sound waves into the inner ear through skull and tissue combined with acoustic properties of the ear and fitting system can result in perception of the occlusion effect. This test simulated the response of the ear canal to internal vibrations. The schematic the test set up is shown in FIG. 6b. A receiver [not shown, Sonion Model 2303] in the side port (71) of ear coupler provided the sound stimulus. Sine wave sweep from 10000 Hz to 100 Hz using the "STWEEP™ function of the software was the sound stimulus used (at a stimulus amplitude of 50 mV and amplifier gain of 18 dB). The SoundCheck software was used to generate the performance graph showing system gain versus frequency. Relative gain peaks in the low frequency range (<1 kHz) are known to contribute to the occlusion effect.

What is claimed:

1. An apparatus for insertion into an ear canal, the apparatus comprising:
   a) a polymeric body having an interior face, an exterior face, and a peripheral portion shaped to conform to a surface of the ear canal, wherein at least a portion of the polymeric body is elastomeric;
   b) acoustic source disposed within said polymeric body for delivering acoustic energy into the ear canal at the interior face of the polymeric body;
   c) a plurality of apertures extending through said polymeric body, said plurality of apertures being separate from said acoustic source to provide air exchange through the plurality of apertures between the interior face and the exterior face, wherein said plurality of apertures are mechanically formed in the polymeric body; and
   d) porous material comprising a membrane covering said plurality of apertures.

2. The apparatus of claim 1 in which the porous material is oleophobic.

3. The apparatus of claim 1, wherein said plurality of apertures are disposed about said acoustic source.

4. The apparatus of claim 1, wherein said membrane comprises expanded PTFE.

5. The apparatus of claim 1, wherein said membrane extends over said interior face of said polymeric body to cover said plurality of apertures.

6. An apparatus for insertion into an ear canal comprising:
   a) a polymeric body having an interior face and an exterior face, the polymeric body comprising porous material, wherein a first portion of said porous material comprises a plurality of areas,
   b) elastomer filling a second portion of said porous material such that said second portion of said polymeric body is air impermeable and includes a peripheral portion shaped to conform to a surface of the ear canal, wherein said plurality of areas of said first portion of said porous material are unfilled by said elastomer to provide air exchange therethrough between said interior face and said exterior face of said polymeric body, and
   c) an acoustic source disposed within the polymeric body for delivering acoustic energy into the ear canal at the interior face of the polymeric body, wherein said unfilled plurality of areas of said first portion of said porous material are separate from said acoustic source.

7. The apparatus of claim 6 in which said polymeric body comprises an open cell polyurethane foam.

8. The apparatus of claim 6 in which said elastomer is selected from the list consisting of: fluoroelastomers, fluorosilicone, silicone, polybutadiene, styrene-butadiene, ethylene propylene diene rubber, butyl rubber, nitril rubber and ethylene vinyl acetate.

9. The apparatus of claim 6, wherein the porous material provides a scaffold for the elastomer in the second portion.

10. The apparatus of claim 6, wherein said plurality of areas are disposed about said acoustic source.

11. The apparatus of claim 10, wherein the porous material provides a scaffold for the elastomer in the second portion.

* * * * *